US012795669B2

(12) United States Patent
Zhang

(10) Patent No.: US 12,795,669 B2
(45) Date of Patent: Nov. 10, 2026

(54) METHOD AND APPARATUS FOR PERFORMING ENHANCED RANDOM ACCESS PROCEDURE

(71) Applicant: ZTE Corporation, Shenzhen (CN)

(72) Inventor: Li Zhang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 708 days.

(21) Appl. No.: 17/487,687

(22) Filed: Sep. 28, 2021

(65) Prior Publication Data

US 2022/0132586 A1 Apr. 28, 2022

Related U.S. Application Data

(63) Continuation of application No. PCT/CN2019/080251, filed on Mar. 28, 2019.

(51) Int. Cl.

| | |
|---|---|
| ***H04W 72/20*** | (2023.01) |
| ***H04W 74/0833*** | (2024.01) |
| ***H04W 74/0836*** | (2024.01) |

(52) U.S. Cl.

CPC ........ *H04W 72/20* (2023.01); *H04W 74/0833* (2013.01); *H04W 74/0836* (2024.01)

(58) Field of Classification Search

None

See application file for complete search history.

(56) References Cited

U.S. PATENT DOCUMENTS

| | | | | |
|---|---|---|---|---|
| 11,470,654 | B2 * | 10/2022 | Deogun | H04W 72/23 |
| 11,716,764 | B2 * | 8/2023 | Turtinen | H04W 72/23 370/329 |
| 2009/0238141 | A1 * | 9/2009 | Damnjanovic | H04W 80/04 370/331 |
| 2014/0185534 | A1 * | 7/2014 | Vos | H04L 1/1819 370/329 |
| 2017/0135135 | A1 * | 5/2017 | Pelletier | H04W 28/0284 |
| 2018/0270698 | A1 * | 9/2018 | Babaei | H04W 72/21 |
| 2019/0230712 | A1 * | 7/2019 | Ou | H04W 72/23 |
| 2020/0107372 | A1 * | 4/2020 | Agiwal | H04W 24/08 |

(Continued)

FOREIGN PATENT DOCUMENTS

| | | | |
|---|---|---|---|
| WO | WO 2012/150809 | A2 | 11/2012 |
| WO | WO 2015/013073 | A1 | 1/2015 |

(Continued)

OTHER PUBLICATIONS

Agiwal et al., "Specification", U.S. Appl. No. 62/738,374, filed Sep. 28, 2018, entire document. (Year: 2018) (Year: 2018).*

(Continued)

*Primary Examiner* — Suk Jin Kang

(74) *Attorney, Agent, or Firm* — Crowell & Moring LLP

(57) ABSTRACT

A method and apparatus for performing an enhanced random access (RACH) procedure is disclosed. In one embodiment, a method performed by a wireless communication node, includes: transmitting first information to a wireless communication device; receiving a first message from the wireless communication device; and transmitting a second message to the wireless communication device, wherein the first information comprises information of a plurality of time windows for the wireless communication device to receive the second message.

4 Claims, 12 Drawing Sheets

(56) References Cited

U.S. PATENT DOCUMENTS

| | | | | |
|---|---|---|---|---|
| 2020/0127777 | A1* | 4/2020 | Papasakellariou | H04W 52/40 |
| 2020/0146054 | A1* | 5/2020 | Jeon | H04L 5/0053 |
| 2020/0178226 | A1* | 6/2020 | Papasakellariou | H04W 52/143 |
| 2020/0178305 | A1* | 6/2020 | Chen | H04W 74/00 |
| 2020/0178314 | A1* | 6/2020 | Liu | H04W 74/0833 |
| 2020/0260497 | A1* | 8/2020 | Ozturk | H04L 27/2692 |
| 2020/0337090 | A1* | 10/2020 | Ohara | H04W 74/006 |
| 2020/0413364 | A1* | 12/2020 | Jeon | H04W 76/40 |
| 2021/0100042 | A1* | 4/2021 | Agiwal | H04W 74/0833 |
| 2022/0061100 | A1* | 2/2022 | Ozturk | H04W 74/00 |
| 2022/0078853 | A1* | 3/2022 | Christoffersson | H04W 74/0833 |
| 2022/0124820 | A1* | 4/2022 | Ko | H04W 56/0045 |
| 2022/0141869 | A1* | 5/2022 | Jeon | H04W 72/0446 370/329 |
| 2022/0141877 | A1* | 5/2022 | Ko | H04W 74/0833 370/329 |
| 2022/0150972 | A1* | 5/2022 | Turtinen | H04B 7/18558 |
| 2022/0232505 | A1* | 7/2022 | Jeon | H04W 74/006 |
| 2022/0272611 | A1* | 8/2022 | Liu | H04W 48/08 |
| 2022/0394680 | A1* | 12/2022 | Kim | H04W 48/12 |
| 2022/0418006 | A1* | 12/2022 | Agiwal | H04L 5/0044 |
| 2023/0072506 | A1* | 3/2023 | Deogun | H04W 72/535 |
| 2023/0156810 | A1* | 5/2023 | Chen | H04W 8/24 370/329 |
| 2023/0232463 | A1* | 7/2023 | Agiwal | H04W 72/23 370/329 |
| 2023/0247679 | A1* | 8/2023 | Turtinen | H04W 72/23 370/329 |
| 2023/0269783 | A1* | 8/2023 | Agiwal | H04W 80/02 370/329 |

FOREIGN PATENT DOCUMENTS

| | | | |
|---|---|---|---|
| WO | WO 2017/192171 | A1 | 11/2017 |
| WO | WO 2018/031799 | A1 | 2/2018 |
| WO | WO 2018/208219 | A1 | 11/2018 |
| WO | WO 2020/164076 | A1 | 8/2020 |

OTHER PUBLICATIONS

Jeon et al., "Specification", U.S. Appl. No. 62/754,527, filed Nov. 1, 2018, entire document. (Year: 2018) (Year: 2018).*

International Search Report and Written Opinion received for Application No. PCT/CN2019/080251 mailed Jan. 2, 2020 (7 pages).

ZTE, "Considerations on channel access procedure for NR-U", *3GPP TSG RAN WG2 NR* #103 Meeting R2-1811281, Aug. 24, 2018 (5 pages).

LG Electronics Inc., "RAR window extension for multi-beam operation," *3GPP TSG-RAN WG2 NR AH* R2-1800567, Jan. 26, 2018 (2 pages).

MediaTek Inc., "Remaining details on RACH procedure," *3GPP TSG RAN WG1 Meeting* 91 R1-1719569, Dec. 1, 2017 (10 pages).

China Office Action for China Patent Application No. 201980094973.7 mailed Jun. 28, 2022 (with English translation) (13 pages).

ZTE: "Considerations on RAR Window Size for NR-U", 3GPP TSG RAN WG2 #104 Meeting; R2-1816832, 3rd Generation Partnership Project (3GPP), Mobile Competence Centre; 650, Route Des Lucioles; F-06921 Sophia-Antipolis Cedex, vol. RAN WG2, No. Spokane, US; Nov. 12, 2018-Nov. 16, 2018, Nov. 12, 2018, XP051556396, Retrieved from the Internet: URL:http://www.3gpp.org/ftp/Meetings%5F3GPP%5FSYNC/RAN2/Docs/R2%2DI816832%2Ezip (2 pp).

MediaTek Inc., "Remaining Details on RACH Procedure," 3GPP TSG-RAN WG1 Meeting 91, R1-171956, Reno, Nevada, Nov. 27-Dec. 1, 2017 (9 pp.).

LG Electronics Inc.: "RAR Window Extention for Multi-Beam Operation", 3GPP TSG-RAN WG2 NR AH; R2-1800567 3rd Generation Partnership Project (3GPP), Mobile Competence Centre; 650, Route Des Lucioles; F-06921 Sophia-Antipolis Cedex, vol. RAN WG2, No. Vancouver, Canada, Jan. 22-26, 2018 (2 pp.).

Extended European Search Report received for EP Application No. 19 92 0772 mailed Sep. 14, 2022 (12 pages).

Ericsson: "RA-RNTI to Handle Longer RAR Window for NR-U", 3GPP TSG-RAN WG2 #105 TDoc R2-1901677, 3rd Generation Partnership Project (3GPP), Mobile Competence Centre; 650, Route Des Lucioles; F-06921 Sophia-Antipolis Cedex, vol. RAN WG2, No. Athens, Greece; Feb. 25, 2019, Feb. 14, 2019, XP051603030, Retrieved From the Internet: URL:http://www.3GPP.org/ftp/tsg%5Fran/WG2%5FRL2/TSGR2%5FI05/Docs/R2%2DI901677%2Ezip, Feb. 25-Mar. 1, 2019 (2 pp.).

Office Action issued for Canada Patent Application No. 3,131,598_ dated Dec. 10, 2024 (4 pp.).

Office Action issued for Korea Patent Application No. 10-2021-7034583 dated Dec. 4, 2024 (7 pp.).

Indonesisan Office Action with unofficial translation issued in Application No. P00202109273 dated Nov. 25, 2025 (6 pages).

* cited by examiner

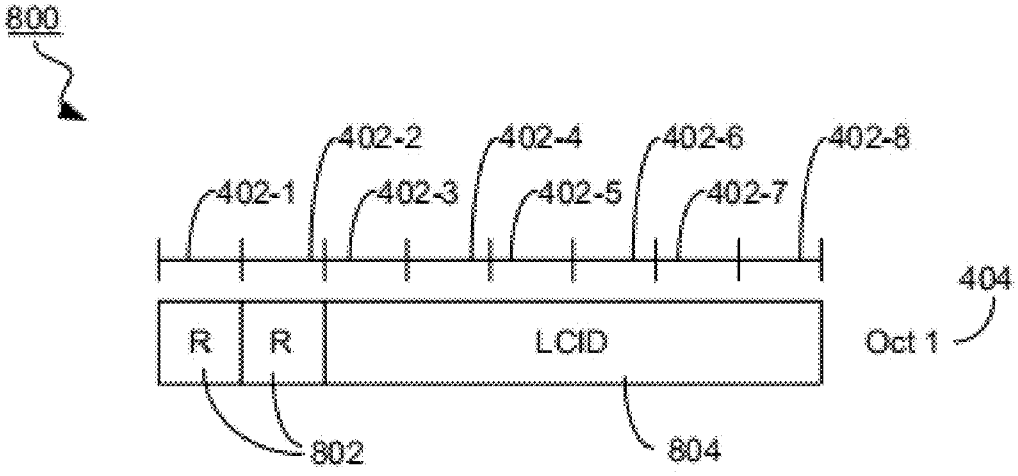

FIG. 8A

810

812 814

| Index | LCID values |
|---|---|
| 0 | CCCH of size 64 bits (referred to as "CCCH1" in TS 38.331 [5]) |
| 1–32 | Identity of the logical channel |
| 33–50 | Reserved |
| 51 | PCI |
| 52 | CCCH of size 48 bits (referred to as "CCCH" in TS 38.331 [5]) |
| 53 | Recommended bit rate query |
| 54 | Multiple Entry PHR (four octet $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

FIG. 8B

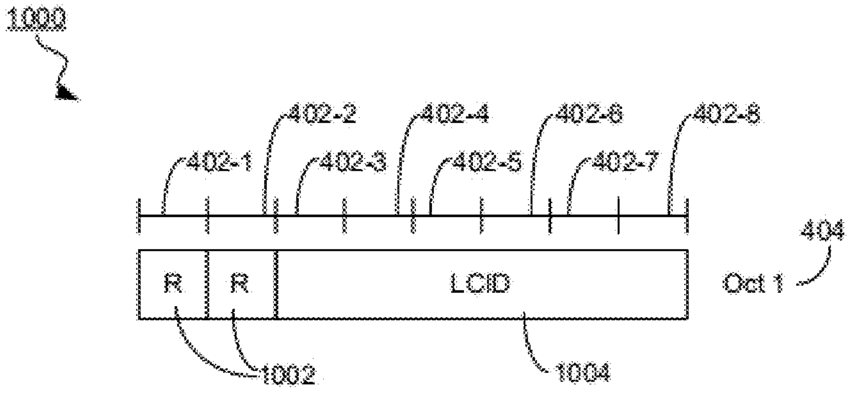

FIG. 10A

1010

1012 1014

| Index | LCID values |
|---|---|
| 0 | CCCH |
| 1-32 | Identity of the logical channel |
| 33-45 | Reserved |
| 46 | Data indication command |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS / CSI-IM Resource Set Activation/Deactivation |
| 56 | Duplication Activation/Deactivation |
| 57 | SCell Activation/Deactivation (four octet) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

FIG. 10B

METHOD AND APPARATUS FOR PERFORMING ENHANCED RANDOM ACCESS PROCEDURE

PRIORITY

This application claims priority as a Continuation of PCT/CN2019/080251, filed on Mar. 28, 2019, entitled "Methods, apparatus and systems for transmitting a data flow with multiple automatic repeat request processes", published as WO 2020/191771 A1, the entire disclosure of which is hereby incorporated by reference.

TECHNICAL FIELD

This disclosure relates generally to wireless communications and, more particularly, to a method and apparatus for performing enhanced random access procedure.

BACKGROUND

Over the past few decades, mobile communications have evolved from voice services to high-speed broadband data services. With further development of new types of services and applications, e.g., enhanced mobile broadband (eMBB), massive Machine-Type Communication (mMTC), Ultra Reliability Low Latency Communication (URLLC), etc., the demands for high-performance data transmission on mobile networks will continue to increase exponentially. Based on specific requirements in these emerging services, wireless communication systems should meet a variety of requirements, such as throughput, latency, data rate, capacity, reliability, link density, cost, energy consumption, complexity, and coverage.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with some embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

Traditional methods which rely on random access of user terminals and scheduled data transmissions between a base station and a user terminal fail to provide satisfactory performance for the aforementioned services due to limited equipment capacity, high latency, and high signaling overhead. In order to meet these demands in 5G/NR (New Radio) communications, a grant-free data transmission method based on competition is being considered. A random access (RACH) procedure is important during initial access from RRC (radio resource control) idle, when performing a RRC connection establishment procedure, for downlink or uplink data transmission when a wireless communication device is not synchronized, and during handover when uplink synchronization is need in a target cell, etc.

To access an unlicensed spectrum during a RACH procedure, a listen-before-talk (LBT) process is required, in which a CCA (clear channel assessment) is performed. The CCA determines the availability of a channel by detecting a presence of any existing signal on the channel. If signals are detected and the channel is occupied, a next LBT process can be performed after a time period until a non-occupied channel is detected, followed by a data transmission. Such a LBT process is performed during each step of a RACH procedure when accessing an unlicensed spectrum, resulting in increased latency and disadvantageously affecting the system performance. Further, when a random access preamble is transmitted and a ra-Response Window is started, if a random access response (RAR) is not received before the expiration of the ra-ResponseWindow, the RAR is failed. Thus, there exists a need to develop a new method to reduce latency in a RACH procedure when accessing an unlicensed spectrum.

In one embodiment, a method performed by a wireless communication node, includes: transmitting first information to a wireless communication device; receiving a first message from the wireless communication device; and transmitting a second message to the wireless communication device, wherein the first information comprises information of a plurality of time windows for the wireless communication device to receive the second message.

In another embodiment, a method performed by a wireless communication device, includes: receiving first information from a wireless communication node; transmitting a first message to the wireless communication node; and receiving a second message from the wireless communication node, wherein the first information comprises information of a plurality of time windows for receiving the second message.

Yet, in another embodiment, a method performed by a wireless communication node, includes: transmitting first information to a wireless communication device; receiving a first message from the wireless communication device; and transmitting a second message to the wireless communication device, wherein the first information comprises a size of a time window for the wireless communication device to receive the second message, wherein the second message is scrambled by a Random Access-Radio Network Temporary Identifier (RA-RNTI), wherein the RA-RNTI is determined according to frequency-domain information of resources for receiving the first message, and wherein the second message comprises one of the following: time-domain information of the resources for receiving the first message and a Start Frame Number (SFN) for receiving the first message.

Yet, in another embodiment, a method performed by a wireless communication device, includes: receiving first information from a wireless communication node; transmitting a first message to the wireless communication node; and receiving a second message from the wireless communication node, wherein the first information comprises a size of a time window for receiving the second message, wherein the second message is scrambled by a Random Access-Radio Network Temporary Identifier (RA-RNTI), wherein the RA-RNTI is determined according to frequency-domain information of resources for transmitting the first message, and wherein the second message comprises one of the following: time-domain information of the resources for transmitting the first message and a Start Frame Number (SFN) for transmitting the first message.

Yet in another embodiment, a computing device comprising at least one processor and a memory coupled to the processor, the at least one processor configured to carry out the method.

Yet, in another embodiment, a non-transitory computer-readable medium having stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

FIG. 8A illustrates an example format of a Media Access Control (MAC) Control Element (CE) subheader, in accordance with one embodiment.

FIG. 8B illustrates a table of Language Code Identifier (LCID) values in a MAC CE subheader, in accordance with one embodiment.

FIG. 8 illustrates an exemplary format of a Media Access Control (MAC) Control Element (CE) subheader, in accordance with some embodiments of the present disclosure.

FIG. 10A illustrates an exemplary format of a Media Access Control (MAC) Control Element (CE) subheader, in accordance with some embodiments of the present disclosure.

FIG. 10B illustrates a table of Language Code Identifier (LCID) values in a Media Access Control (MAC) Control Element (CE) subheader, in accordance with some embodiments of the present disclosure.

DETAILED DESCRIPTION OF EXEMPLARY EMBODIMENTS

Figure 1A:
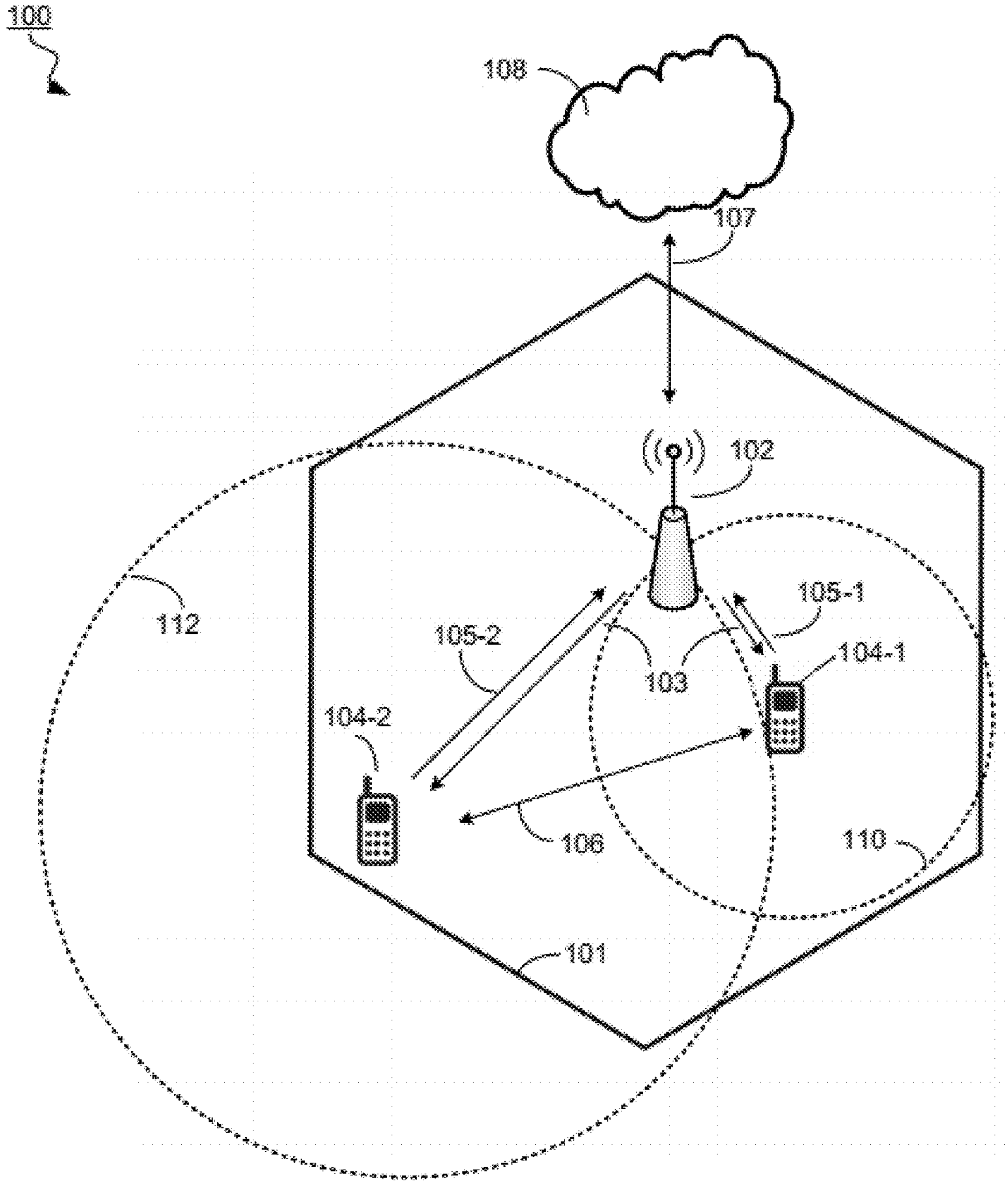
FIG. 1A illustrates an exemplary wireless communication network illustrating achievable modulation as a function of distance from a BS, in accordance with some embodiments of the present disclosure.

Various exemplary embodiments of the invention are described below with reference to the accompanying figures to enable a person of ordinary skill in the art to make and use the embodiments. As would be apparent to those of ordinary skill in the art, after reading the present disclosure, various changes or modifications to the examples described herein can be made without departing from the scope of the embodiments. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network side communication node or a base station (BS) can be a node B, an E-utran Node B (also known as Evolved Node B, eNodeB or eNB), a pico station, a femto station, or the like. A terminal side node or a user equipment (UE) can be a long range communication system like a mobile phone, a smart phone, a personal digital assistant (PDA), tablet, laptop computer, or a short range communication system such as, for example a wearable device, a vehicle with a vehicular communication system and the like. A network and a terminal side communication node are represented by a BS 102 and a UE 104, respectively, which are generally referred to as "communication nodes" hereinafter in all the embodiments in this disclosure. Such communication nodes may be capable of wireless and/or wired communications, in accordance with some embodiments of the invention. It is noted that all the embodiments are merely preferred examples, and are not intended to limit the present disclosure. Accordingly, it is understood that the system may include any desired combination of UE's and BSs, while remaining within the scope of the present disclosure.

Referring to FIG. 1A, the wireless communication network 100 includes a BS 102 and a UE 104*a*, and a UE 104*b* (collectively referred to as UE's 104 herein). The BS 102 and the UE's 104 are contained within a geographic boundary of cell 101. A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. Although only 2 UE's 104 are shown in FIG. 1A, it should be noted that any number of UE's 104 can be included in the cell 101 and are within the scope of this invention. In some embodiments, the coverage of uplink communication 105*b* is larger than that of the uplink communication 105*a*, as indicated by dotted circles 112 and 110, respectively. The BS 102 is located at the intercept region of the coverage areas 110 and 112 in order for the BS 102 to perform uplink communication with the UE 104*a* and UE 104*b* in the cell 101.

The direct communication channels 105/103 between the UE's 104 and the BS 102 can be through interfaces such as an Uu interface, which is also known as UMTS (Universal Mobile Telecommunication System (UMTS) air interface. The direct communication channels (sidelink transmission) 106 between the UE's can be through a PC5 interface, which is introduced to address high moving speed and high density applications such as Vehicle-to-Vehicle (V2V) communications. The BS 102 is connected to a core network (CN) 108 through an external interface 107, e.g., an Iu interface.

The UE's 104*a* and 104*b* obtains its synchronization timing from the BS 102, which obtains its own synchronization timing from the core network 108 through an internet time service, such as a public time NTP (Network Time Protocol) server or a RNC (Radio Frequency Simulation System Network Controller) server. This is known as network-based synchronization. Alternatively, the BS 102 can also obtain synchronization timing from a Global Navigation Satellite System (GNSS) (not shown) through a satellite signal 106, especially for a large BS in a large cell which has a direct line of sight to the sky, which is known as satellite-based synchronization.

Figure 1B:
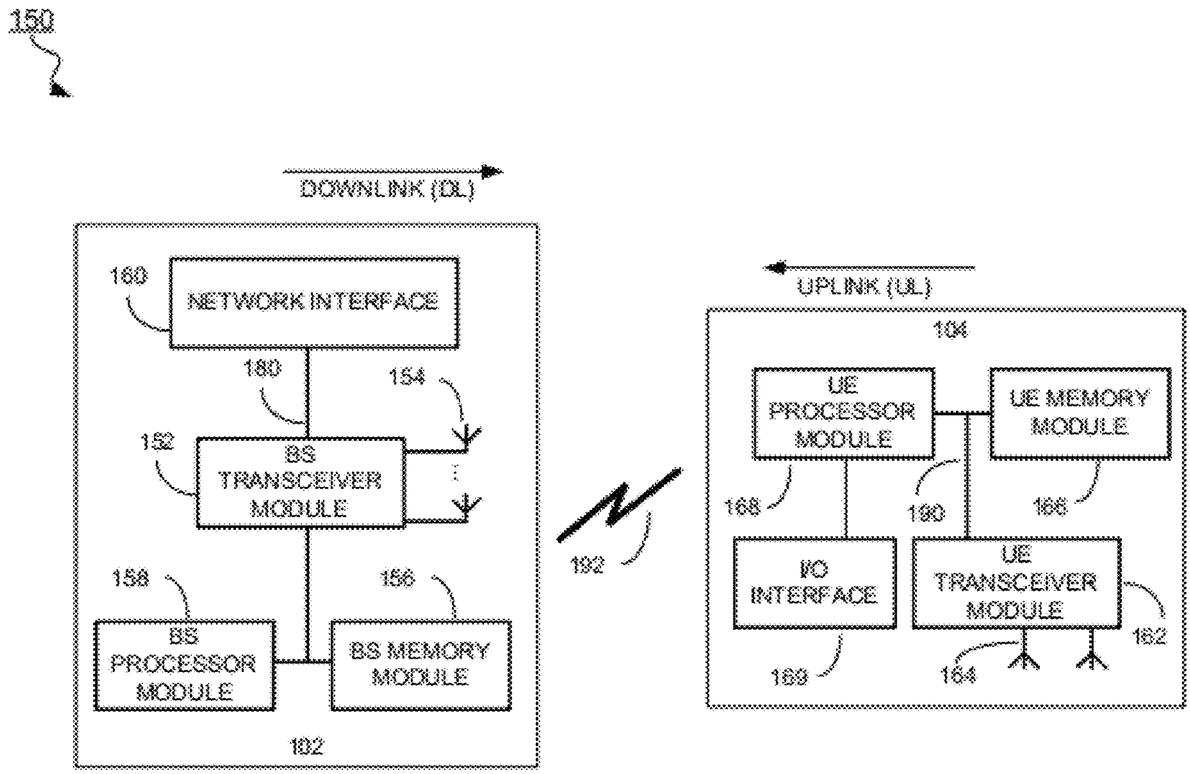
FIG. 1B illustrates a block diagram of an exemplary wireless communication system for a slot structure information indication, in accordance with some embodiments of the present disclosure.

FIG. 1B illustrates a block diagram of an exemplary wireless communication system 150, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a BS 102 and two UEs 104*a* and 104*b*, collectively referred to as UE 104 below for ease of discussion. The BS 102 includes a BS transceiver module 152, a BS antenna array 154, a BS memory module 156, a BS processor module 158, and a Network interface 160, each module being coupled and interconnected with one another as necessary via a data communication bus 180. The UE 104 includes a UE transceiver module 162, a UE antenna 164, a UE memory module 166, a UE processor module 168, and an input/output (I/O) interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of blocks, modules, circuits, etc. other than those shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192 or with other UEs via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some embodiments, the BS transceiver 152 is configured to transmit the physical downlink control channel (PDCCH) and configured slot structure related information (SFI) entry set to the UE transceiver 162. In some embodiments, the UE transceiver 162 is configured to receive PDCCH containing at least one SFI field from the BS transceiver 152. In some exemplary embodiments, the UE transceiver 162 and the BS transceiver 152 are configured to support industry standards such as the Long Term Evolution (LTE) and emerging 5G standards, and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The BS processor modules 158 and UE processor modules 168 are implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Then the UE processor module 168 detects the PHR triggering message on the UE transceiver module 162, the UE processor module 168 is further configured to determine at least one second SFI entry set based on at least one predefined algorithm and the received at least one first SFI entry set configured by the BS 102, wherein the at least one predefined algorithm is selected based on other parameters calculated or messages received. The UE processor module 168 is further configured to generate the at least one second SFI entry set and monitor the PDCCH received on the UE transceiver module 162 to further receive the at least one SFI field. As used herein, "SFI entry set" means SFI table or SFI entries.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell 101 where the BS 102 is located, and in general, to operate properly within the cell 101. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192. In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid communication network in which the UE communicates with the BS 102, and with other UEs, e.g., between 104*a* and 104*b*. As described in further detail below, the UE 104 supports sidelink communications with other UE's as well as downlink/uplink communications between the BS 102 and the UE 104. As discussed above, sidelink communication allows the UEs 104*a* and 104*b* to establish a direct communication link with each other, or with other UEs from different cells, without requiring the BS 102 to relay data between UE's.

Figure 2:
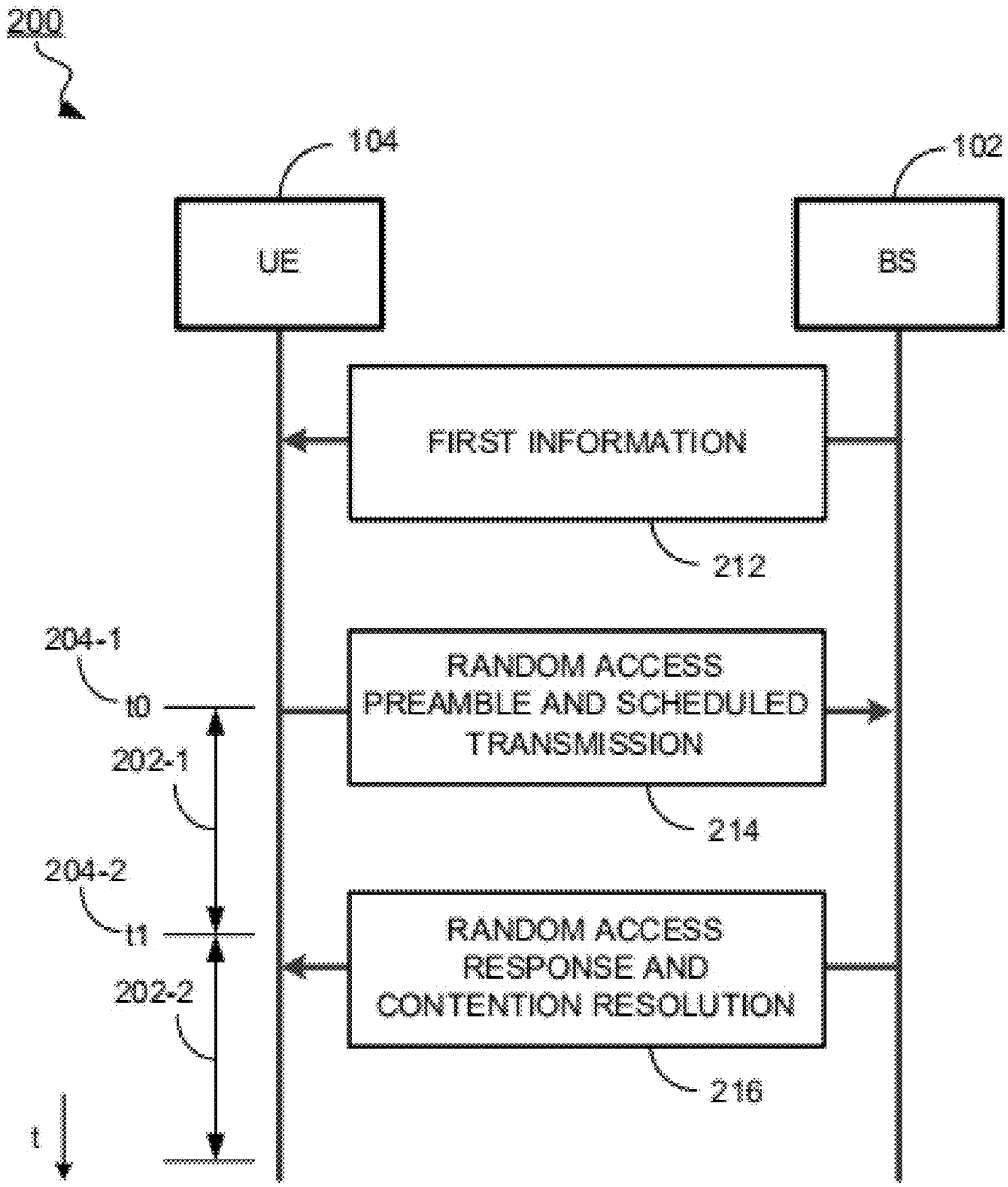
FIG. 2 illustrates a method of performing a 2-step contention-based Random Access (RACH) procedure in a wireless communication system, according to some embodiments of the present disclosure.

FIG. 2 illustrates a method 200 of performing a 2-step contention-based Random Access (RACH) procedure in a wireless communication system, according to some embodiments of the present disclosure. In the illustrated embodiment, the wireless communication system comprises a BS 102 and a UE 104. It is understood that additional operations may be provided before, during, and after the method 200 of FIG. 2, and that some other operations may be omitted or only briefly described herein. It should be noted FIG. 2 is an example for illustration and discussion purposes.

The method 200 starts with operation 212 in which the UE 104 receives first information from the BS 102 according to some embodiments. In some embodiments, the first information comprises information of a plurality of time windows including at least one of the following: a number of a plurality of time windows and a size of each of the plurality of time windows. In some embodiments, the first information is transmitted in system information or a Radio Resource Control (RRC) message. In some embodiments, each of the plurality of time windows is configured for receiving a RA response by the UE 104 from the BS 102. In some embodiments, the plurality of time windows comprises at least one of the following: at least one ra-ResponseWindow and at least one time offset. In some embodiments, the information of the plurality of time windows can be received by the UE 104 from the BS 102 through an RRC message. In some embodiments, the first information further comprises at least one Search Space (SS) and at least one Control Resource Set (CORESET). In some embodiments, the at least one SS and the at least one CORESET provides information of resources in the time and frequency domain for receiving Downlink Control Information (DCI) on a Physical Downlink Control Channel (PDCCH) in a RA response by the UE 104 from the BS 102. In some embodiments, RACH configurations, e.g., random access preamble format, transmission timing, and PRACH index, are also configured to the UE 104 through the system information or the RRC message.

In some embodiments, the first information further comprises a correlation between each of the plurality of time windows and at least one of the following: the at least one CORESET and the at least one SS. In some embodiments, each of the plurality of time windows can be distinguished by at least one of the following: a corresponding Control Resource Set (CORESET) and a corresponding Search Space (SS). For example, 2 time windows can be configured can be configured to the UE 104 via system information or a RRC message. The 2 time windows comprises a first time window and a second time window. The first time window is a first ra-ResponseWindow and the second time window is one of the following: a second ra-ResponseWindow and a time offset. In some embodiments, the first time window is determined by a first CORESET and by a first SS; and the second time window is determined by a second CORESET and a second SS. In some embodiments, the first CORESET and the second CORESET each comprises information of resources on the frequency domain for receiving the DCI on the PDCCH. In some embodiments, the first SS and the second SS each comprises information of resource on the time domain for receiving the DCI on the PDCCH. In some embodiments, the first CORESET is the same as the second CORESET, i.e., same resource in the frequency domain for receiving the DCI on the PDCCH. In some other embodiments, the first CORESET is different from the second CORESET. In some embodiments, the first SS is the same as the second SS. In some other embodiments, the first SS is different from the second SS.

The method 200 continues with operation 214 in which the UE 104 transmits a random access preamble and scheduled transmission to the BS 102 according to some embodiments. Before transmitting the random access preamble to the BS 102, the UE 104 performs a LBT process on the selected at least one PRACH occasion. In some embodiments, the LBT process comprises sensing interference and bursty arrivals of packets through its transmitters to determine interference level and traffic loads on the uplink carrier. If the LBT process fails, the UE 104 restarts the LBT process at the following PRACH occasion on the corresponding uplink carrier until the LBT process passes (i.e., the uplink carrier is available and unoccupied). The UE 104 then starts first transmissions of random access preambles to the BS 102 on the PRACH occasion. The UE 104 starts a first time window (i.e., ra-ResponseWindow) at the start (i.e., t0) of a first PDCCH occasion. In some embodiments, the size of the time window in the time domain is preconfigured by the system and transmitted to the UE 104 in the system information.

The method 200 continues with operation 216 in which the BS 102 transmits a random access (RA) response and contention resolution to the UE 104, according to some embodiments. In some embodiments, the RA response comprises a MAC Random Access Response (RAR). In some embodiments, the DCI is transmitted on the PDCCH and the MAC RAR is transmitted on the PDSCH. Continue with the example above, the UE 104 monitor the PDCCH on resources defined by the first SS and the first CORESET, which corresponds to the first time window.

In some embodiments, when the MAC RAR is not received before the end of the first time window (i.e., the first ra-ResponseWindow), and when the second time window is a second ra-ResponseWindow, the UE 104 starts a second ra-ResponseWindow at time t1. In some embodiments, the time t1 is the end of the first PDCCH occasion and at the start of a second PDCCH occasion. In some other embodiments, when the MAC RAR is received before the end of the first time window (i.e., the first ra-ResponseWindow), the second time window is not initiated.

In some other embodiments, the MAC RAR is not received before the end of the first time window (i.e., the first ra-ResponseWindow) at t1, and when the second time window is a time offset, the UE 104 continues with the monitoring of the first PDCCH within the time offset.

In some embodiments, each of the plurality of time windows can be distinguished by a window indication in the RA response received by the UE 104 from the BS 102. In some embodiments, the window indication to indicate a time window is transmitted in one of the following: the DCI on the PDCCH and the MAC RAR on the PDSCH. For example, 2 time windows can be configured to the UE 104 via system information or a RRC message. The 2 time windows comprise a first time window and a second time window. The first time window is a first ra-ResponseWindow and the second time window is one of the following: a second ra-ResponseWindow and a time offset.

In some embodiments, the MAC RAR comprises a window indication (WI) field with at least one bit for window indication. For example, a value of 0 of the WI field indicates the first time window is used; and a value of 1 of the WI field indicates the second time window is used. For example, when the UE 104 receives the RAR message from the BS 102 within the first time window (i.e., the first ra-ResponseWindow), when the RAR message comprises a preamble matches the preamble transmitted in the Random Access preamble message, and when the WI field has a value of 0, the RAR message is successfully received by the UE 104. Similarly, when the UE 104 receives the RAR message from the BS 102 within the second time window (i.e., the second ra-ResponseWindow), when the RA response message comprises a preamble matches the preamble transmitted in the Random Access Preamble Message, and when the WI field has a value of 1, the RAR message from the BS 102 is successfully received by the UE 104. For another example, when the RAR message comprises a preamble matches the preamble transmitted in the Random Access preamble message, and when the WI field has a value of 1, the reception of the RAR message by the UE 104 is failed. Similarly, when the UE 104 receives the RAR message from the BS 102 within the second time window (i.e., the second ra-ResponseWindow), when the RAR message comprises a preamble matches the preamble transmitted in the Random Access Preamble Message, and when the WI field has a value of 0, the reception of the RAR message from the BS 102 by the UE 104 is failed.

In some other embodiments, the MAC RAR comprises a window indication (WI) field with at least one bit for window and time offset indication. For example, a value of 0 of the WI field indicates the first time window is used; and a value of 1 of the WI field indicates the second time window is used. For example, when the UE 104 receives the RAR message from the BS 102 within the first time window (i.e., the first ra-ResponseWindow), when the RAR message comprises a preamble matches the preamble transmitted in the Random Access preamble message, and when the WI field has a value of 0, the RAR message is successfully received by the UE 104. Similarly, when the UE 104 receives the RAR message from the BS 102 within the second time window (i.e., the time offset), when the RAR message comprises a preamble matches the preamble transmitted in the Random Access Preamble Message, and when the WI field has a value of 1, the RAR message from the BS 102 is successfully received by the UE 104. For another example, when the UE 104 receives the RAR message from the BS 102 within the first time window (i.e., the first ra-ResponseWindow), when the RAR message comprises a preamble matches the preamble transmitted in the Random Access preamble message, and when the WI field has a value of 1, the reception of the RAR message by the UE 104 is failed. Similarly, when the UE 104 receives the RAR message from the BS 102 within the second time window (i.e., the time offset), when the RAR message comprises a preamble matches the preamble transmitted in the Random Access Preamble Message, and when the WI field has a value of 0, the reception of the RAR message from the BS 102 by the UE 104 is failed.

In some embodiments, each of the plurality of time windows can be indicated by a Start Frame number (SFN) of a RACH occasion for transmitting the random access preamble in the first message. In some embodiments, the SFN of a RACH occasion is determined by the BS 102 according to the SFN of receiving the random access preamble. In some embodiments, the SFN can be transmitted in one of the following: a MAC RAR and a DCI. For example, 10 bits in a MAC RAR or DCI can be used for representing the SFN for transmitting the radio access preamble. 3 lower bits of the 10 bits can be used for indicating the SFN. For another example, a radio frame in the MAC RAR or DCI can be used for representing the SFN for transmitting the radio access preamble. The radio frame is the SFN mod N, wherein N is an integer.

When the UE 104 receives the MACR RAR or the DCI, the UE 104 compares the SFN in the MAC RAR or the DCI with the SFN used for transmitting the random access preamble so as to differentiate different time windows. If the SFN in the MAC RAR or the DCI received by the UE 104 from the BS 102 in a first time window matches the SFN for transmitting the random access preamble by the UE 104, the random access response is received successfully by the UE 104. If the SFN in the MAC RAR or the DCI received by the UE 104 from the BS 102 in a first time window does not match the SFN for transmitting the random access preamble by the UE 104, the random access response is failed.

Figure 3:
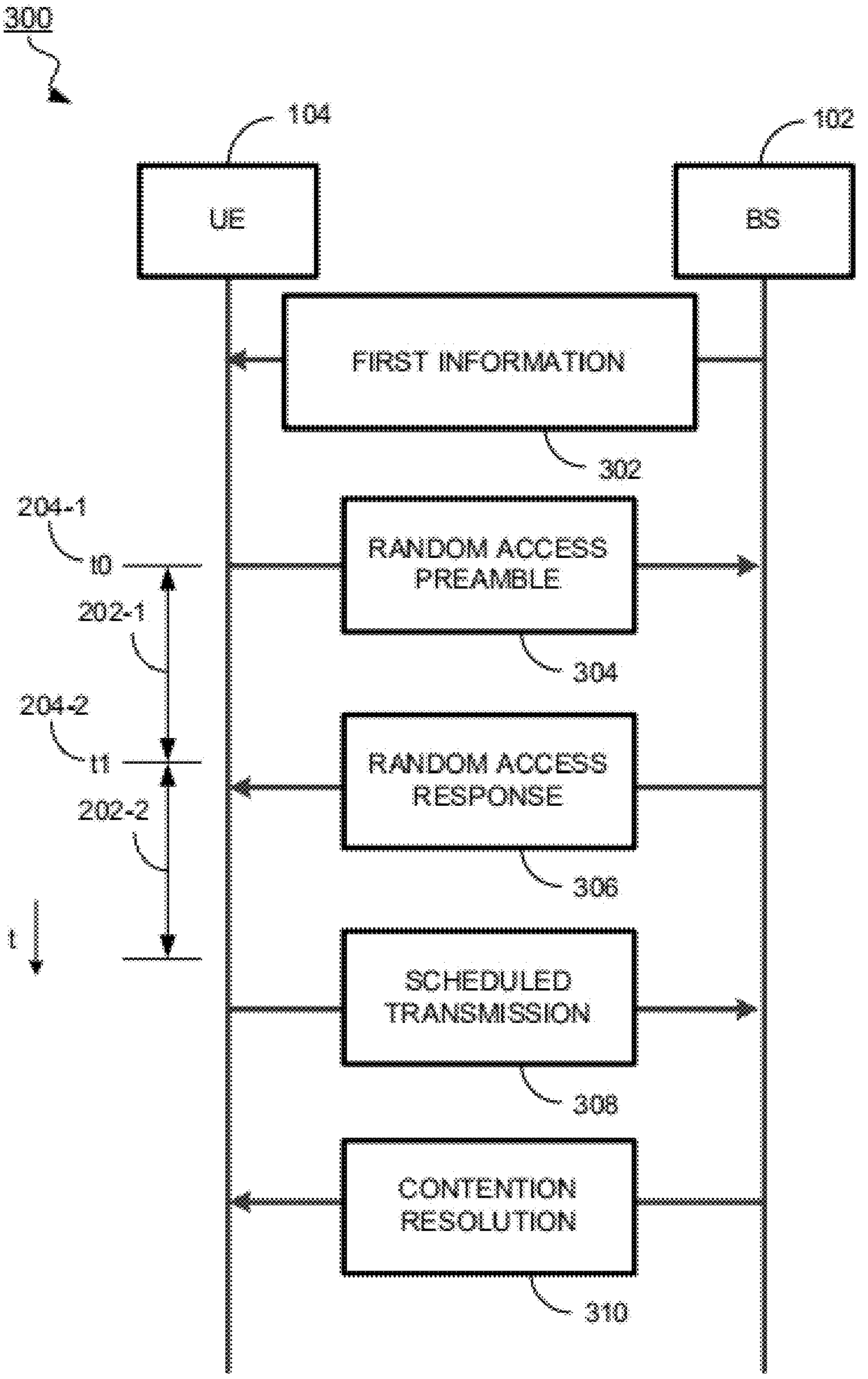
FIG. 3 illustrates a method of performing a 4-step contention-based Random Access (RACH) procedure in a wireless communication system, according to some embodiments of the present disclosure.

FIG. 3 illustrates a method 300 of performing a 4-step contention-based Random Access (RACH) procedure in a wireless communication system, according to some embodiments of the present disclosure. In the illustrated embodiment, the wireless communication system comprises a BS 102 and a UE 104. It is understood that additional operations may be provided before, during, and after the method 300 of FIG. 3, and that some other operations may be omitted or only briefly described herein. It should be noted FIG. 3 is an example for illustration and discussion purposes.

The method 300 starts with operation 302 in which the UE 104 receives first information from the BS 102 according to some embodiments. In some embodiments, the first information comprises information of a plurality of time windows including at least one of the following: a number of a plurality of time windows and a size of each of the plurality of time windows. In some embodiments, the first information is transmitted in system information or a RRC message. In some embodiments, each of the plurality of time windows is configured for receiving a RA response by the UE 104 from the BS 102. In some embodiments, the plurality of time windows comprises at least one of the following: at least one ra-ResponseWindow and at least one time offset. In some embodiments, the information of the plurality of time windows can be received by the UE 104 from the BS 102 through an RRC message. In some embodiments, the first information comprises at least one Search Space (SS) and at least one Control Resource Set (CORESET). In some embodiments, the at least one SS and the at least one CORESET provides information of resources in the time and frequency domain for receiving Downlink Control Information (DCI) on a Physical Downlink Control Channel (PDCCH) in a RA response by the UE 104 from the BS 102. In some embodiments, RACH configurations, e.g., random access preamble format, transmission timing, and PRACH configuration index, are also configured to the UE 104 through the system information or the RRC message.

In some embodiments, the first information further comprises a correlation between each of the plurality of time windows and at least one of the following: the at least one CORESET and the at least one SS. In some embodiments, each of the plurality of time windows can be distinguished by at least one of the following: a corresponding Control Resource Set (CORESET) and a corresponding Search Space (SS). For example, 2 time windows can be configured to the UE 104 via system information or a RRC message. The 2 time windows comprise a first time window and a second time window. The first time window is a first ra-ResponseWindow and the second time window is one of the following: a second ra-ResponseWindow and a time offset. In some embodiments, the first time window is determined by a first CORESET and by a first SS; and the second time window is determined by a second CORESET and a second SS. In some embodiments, the first CORESET and the second CORESET each comprises information of resources on the frequency domain for receiving the DCI on the PDCCH. In some embodiments, the first SS and the second SS each comprises information of resource on the time domain for receiving the DCI on the PDCCH. In some embodiments, the first CORESET is the same as the second CORESET, i.e., same resource in the frequency domain for receiving the DCI on the PDCCH. In some other embodiments, the first CORESET is different from the second CORESET. In some embodiments, the first SS is the same as the second SS. In some other embodiments, the first SS is different from the second SS.

The method 300 continues with operation 304 in which the UE 104 transmits a random access preamble to the BS 102 according to some embodiments. Before transmitting the random access preamble to the BS 102, the UE 104 performs a LBT process on the selected at least one PRACH occasion. In some embodiments, the LBT process comprises sensing interference and bursty arrivals of packets through its transmitters to determine interference level and traffic loads on the uplink carrier. If the LBT process fails, the UE 104 restarts the LBT process at the following PRACH occasion on the corresponding uplink carrier until the LBT process passes (i.e., the uplink carrier is available and unoccupied). The UE 104 then starts first transmissions of random access preambles to the BS 102 on the PRACH occasion. The UE 104 starts a first time window (i.e., ra-ResponseWindow) at the start (i.e., t0) of a first PDCCH occasion. In some embodiments, the size of the time window in the time domain is preconfigured by the system and transmitted to the UE 104 in the system information.

The method 300 continues with operation 306 in which the BS 102 transmits a random access (RA) response to the UE 104, according to some embodiments. In some embodiments, the RA response comprises a MAC Random Access Response (RAR), which are generated according to the random access preamble received from the UE 104. In some embodiments, the DCI is transmitted on the PDCCH and the MAC RAR is transmitted on the PDSCH. Continue with the example above, the UE 104 monitor the PDCCH on resources defined by the first SS and the first CORESET, which corresponds to the first time window.

In some embodiments, when the MAC RAR is not received before the end of the first time window (i.e., the first ra-ResponseWindow), and when the second time window is a second ra-ResponseWindow, the UE 104 starts a second ra-ResponseWindow at time t1. In some embodiments, the time t1 is the end of the first PDCCH occasion and at the start of a second PDCCH occasion. In some other embodiments, when the MAC RAR is received before the end of the first time window (i.e., the first ra-ResponseWindow), the second time window is not initiated.

In some other embodiments, the MAC RAR is not received before the end of the first time window (i.e., the first ra-ResponseWindow) at t1, and when the second time window is a time offset, the UE 104 continues with the monitoring of the first PDCCH within the time offset.

In some embodiments, each of the plurality of time windows can be distinguished by a window indication in the RA response received by the UE 104 from the BS 102. In some embodiments, the window indication to indicate a time window is transmitted in one of the following: the DCI on the PDCCH and the MAC RAR on the PDSCH. For example, 2 time windows can be configured to the UE 104 via system information or a RRC message. The 2 time windows comprise a first time window and a second time window. The first time window is a first ra-ResponseWindow and the second time window is one of the following: a second ra-ResponseWindow and a time offset.

In some embodiments, the MAC RAR comprises a window indication (WI) field with at least one bit for window indication. An example of a MAC RAR format is discussed below in FIG. 4. For example, a value of 0 of the WI field indicates the first time window is used; and a value of 1 of the WI field indicates the second time window is used. For example, when the UE 104 receives the RAR message from the BS 102 within the first time window (i.e., the first ra-ResponseWindow), when the RAR message comprises a preamble matches the preamble transmitted in the Random Access preamble message, and when the WI field has a value of 0, the RAR message is successfully received by the UE 104. Similarly, when the UE 104 receives the RAR message from the BS 102 within the second time window (i.e., the second ra-ResponseWindow), when the RA response message comprises a preamble matches the preamble transmitted in the Random Access Preamble Message, and when the WI field has a value of 1, the RAR message from the BS 102 is successfully received by the UE 104. For another example, when the RAR message comprises a preamble matches the preamble transmitted in the Random Access preamble message, and when the WI field has a value of 1, the reception of the RAR message by the UE 104 is failed. Similarly, when the UE 104 receives the RAR message from the BS 102 within the second time window (i.e., the second ra-ResponseWindow), when the RAR message comprises a preamble matches the preamble transmitted in the Random Access Preamble Message, and when the WI field has a value of 0, the reception of the RAR message from the BS 102 by the UE 104 is failed.

In some other embodiments, the MAC RAR comprises a window indication (WI) field with at least one bit for window and time offset indication. For example, a value of 0 of the WI field indicates the first time window is used; and a value of 1 of the WI field indicates the second time window is used. For example, when the UE 104 receives the RAR message from the BS 102 within the first time window (i.e., the first ra-ResponseWindow), when the RAR message comprises a preamble matches the preamble transmitted in the Random Access preamble message, and when the WI field has a value of 0, the RAR message is successfully received by the UE 104. Similarly, when the UE 104 receives the RAR message from the BS 102 within the second time window (i.e., the time offset), when the RAR message comprises a preamble matches the preamble transmitted in the Random Access Preamble Message, and when the WI field has a value of 1, the RAR message from the BS 102 is successfully received by the UE 104. For another example, when the UE 104 receives the RAR message from the BS 102 within the first time window (i.e., the first ra-ResponseWindow), when the RAR message comprises a preamble matches the preamble transmitted in the Random Access preamble message, and when the WI field has a value of 1, the reception of the RAR message by the UE 104 is failed. Similarly, when the UE 104 receives the RAR message from the BS 102 within the second time window (i.e., the time offset), when the RAR message comprises a preamble matches the preamble transmitted in the Random Access Preamble Message, and when the WI field has a value of 0, the reception of the RAR message from the BS 102 by the UE 104 is failed.

In some embodiments, each of the plurality of time windows can be indicated by a Start Frame number (SFN) of a RACH occasion for transmitting the random access preamble in the first message. In some embodiments, the SFN of a RACH occasion is determined by the BS 102 according to the SFN of receiving the random access preamble. In some embodiments, the SFN can be transmitted in one of the following: a MAC RAR and a DCI. For example, 10 bits in a MAC RAR or DCI can be used for representing the SFN for transmitting the radio access preamble. 3 lower bits of the 10 bits can be used for indicating the SFN. For another example, a radio frame in the MAC RAR or DCI can be used for representing the SFN for transmitting the radio access preamble. The radio frame is the SFN mod N, wherein N is an integer.

When the UE 104 receives the MACR RAR or the DCI, the UE 104 compares the SFN in the MAC RAR or the DCI with the SFN used for transmitting the random access preamble so as to differentiate different time windows. If the SFN in the MAC RAR or the DCI received by the UE 104 from the BS 102 in a first time window matches the SFN for transmitting the random access preamble by the UE 104, the random access response is received successfully by the UE 104. If the SFN in the MAC RAR or the DCI received by the UE 104 from the BS 102 in a first time window does not match the SFN for transmitting the random access preamble by the UE 104, the random access response is failed.

Figure 4:
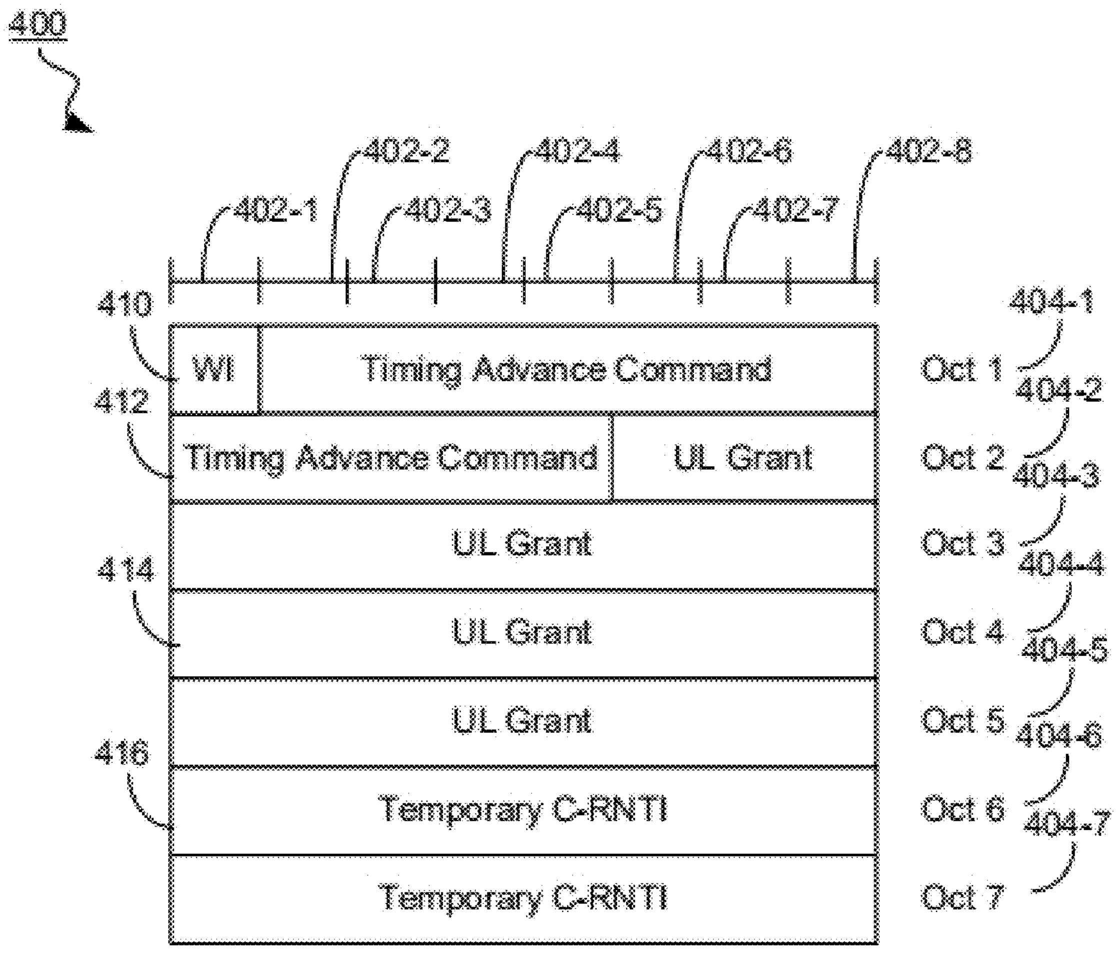
FIG. 4 illustrates an exemplary format of a Media Access Control (MAC) Random Access Response (RAR), in accordance with some embodiments of the present disclosure.

FIG. 4 illustrates an exemplary format of a MAC RAR 400, in accordance with some embodiments of the present disclosure. In the illustrated embodiment, the MAC RAR 400 is transmitted on a PDSCH and comprises a window indication field 410 occupying first 1 bit 402 of a first Oct 404-1 (Oct 1). In the illustrated embodiment, the MAC RAR 400 further comprises a first Timing Advance Command field 412 occupying last 7 bits 402 of the first Oct (Oct 1), a second Timing Advance Command field 412 occupying first 5 bits 402 of a second Oct 404-2 (Oct 2), a first UL Grant field 414 occupying last 3 bits 402 of the second Oct 404-2 (Oct 2), a second UL Grant field 414 occupying 8 bits 402 of a third Oct 404-3 (Oct 3), a third UL Grant field 414 occupying 8 bits 402 of a fourth Oct 404-4 (Oct 4), and a fourth UL Grant field 414 occupying 8 bits 402 of a fifth Oct 404-5 (Oct 5). In the illustrated embodiment, the MAC RAR 400 further comprises a first temporary C-RNTI field 416 occupying 8 bits 402 of a sixth Oct 404-6 (Oct 6) and a second temporary C-RNTI field 416 occupying 8 bits 402 of a seventh Oct 404-7 (Oct 7). It should be noted that FIG. 4 is an exemplary format of the MAC RAR 400 and is not intended to be limiting. Any MAC RAR with a WI field can be used and is within the scope of this invention.

The method 300 continues with operation 308 in which a scheduled transmission is received by the BS 102 from the UE 104 according to some embodiments. In some embodiments, the scheduled transmission is received by the BS 102 on the PUSCH. In some embodiments, the scheduled transmission is received on resources in the time and frequency domain indicated by the MAC RAR received by the UE 104 from the BS 102.

The method 300 continues with operation 310 in which a contention-resolution message is generated and transmitted by the BS 102 to the UE 104 according to some embodiments. In some embodiments, the contention resolution message comprises random access connection setup from the BS 102. In some embodiments, the BS 102 perform a LBT process to determine the availability of the downlink carriers before transmitting the contention resolution message.

Figure 5:
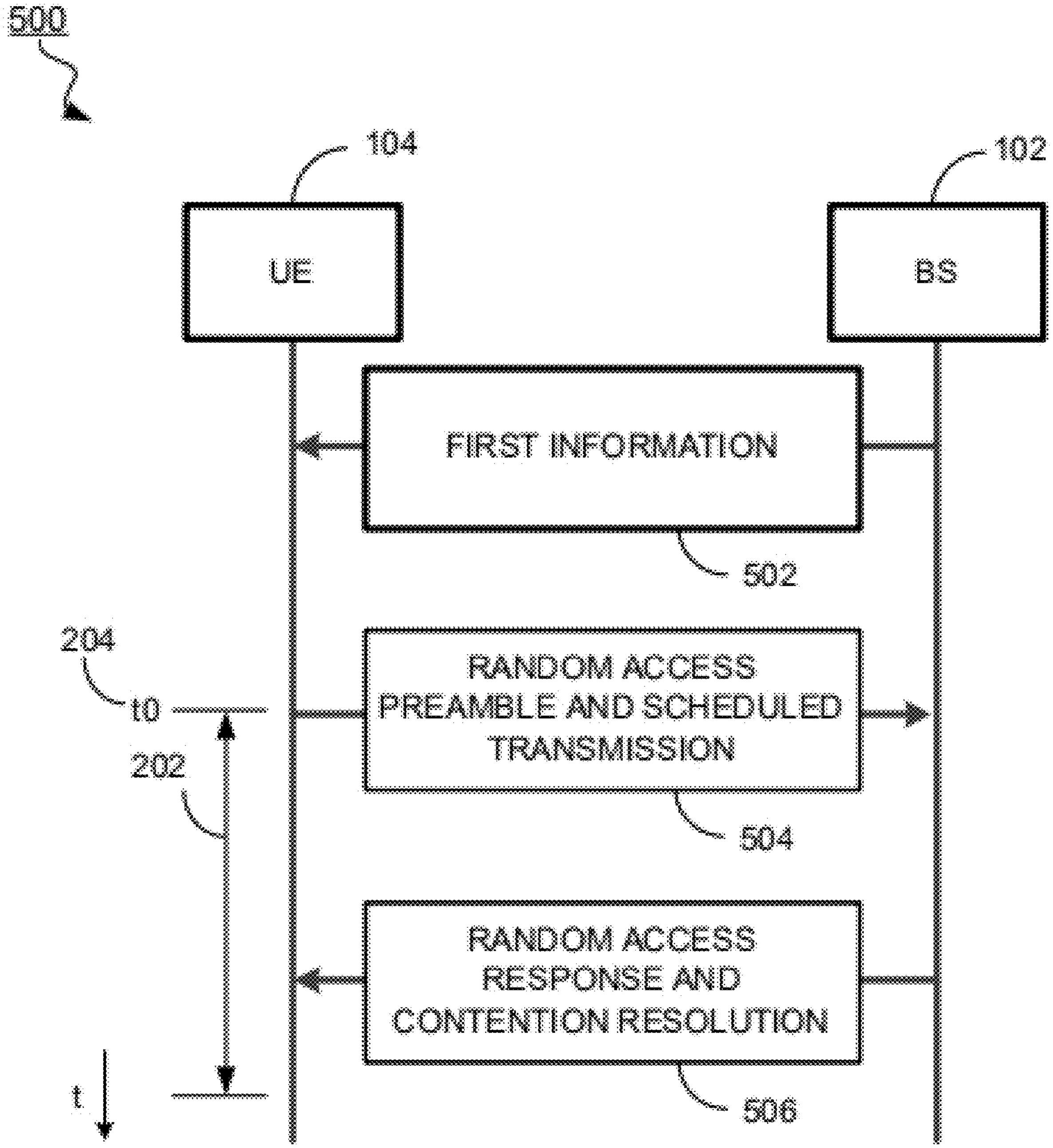
FIG. 5 illustrates a method of performing a 2-step contention-based Random Access (RACH) procedure in a wireless communication system, according to some embodiments of the present disclosure.

FIG. 5 illustrates a method 500 of performing a 2-step contention-based Random Access (RACH) procedure in a wireless communication system, according to some embodiments of the present disclosure. In the illustrated embodiment, the wireless communication system comprises a BS 102 and a UE 104. It is understood that additional operations may be provided before, during, and after the method 500 of FIG. 5, and that some other operations may be omitted or only briefly described herein. It should be noted FIG. 5 is an example for illustration and the 2-step contention-based RACH process of FIG. 5 is used for discussion purposes. It should be noted that the method 500 can be also used in a 4-step contention-based RACH process.

The method 500 starts with operation 502 in which the UE 104 receives first information from the BS 102 according to some embodiments. In some embodiments, the first information comprises information of a time windows. In some embodiments, the first information is transmitted in system information or a Radio Resource Control (RRC) message. In some embodiments, the time windows is configured for receiving a RA response by the UE 104 from the BS 102. In some embodiments, a size of the time window (e.g., 20 millisecond) is configured by the BS 102 in the first information.

The method 500 continues with operation 504 in which the UE 104 transmits a random access preamble and scheduled transmission to the BS 102 according to some embodiments. Before transmitting the random access preamble to the BS 102, the UE 104 performs a LBT process on the selected at least one PRACH occasion. In some embodiments, the LBT process comprises sensing interference and bursty arrivals of packets through its transmitters to determine interference level and traffic loads on the uplink carrier. If the LBT process fails, the UE 104 restarts the LBT process at the following PRACH occasion on the corresponding uplink carrier until the LBT process passes (i.e., a channel is available and unoccupied). The UE 104 then starts first transmissions of random access preambles to the BS 102 on the PRACH occasion. The UE 104 starts the time window 202 (i.e., ra-ResponseWindow) at the start (i.e., t0) 204 of a first PDCCH occasion.

The method 500 continues with operation 506 in which the BS 102 generates and transmits a random access (RA) response and contention resolution to the UE 104, according to some embodiments. The BS 102 further calculates RA-RNTI (Random Access-Radio Network Temporary Identifier) values according to information of the resources on which the random access preambles are transmitted on the frequency domain. In some embodiments, the RA-RNTI value can be is a function of at least one of the following: an index of the first frequency of the PRACH occasion in a system frame and a UL carrier used for the random access preamble.

In some embodiments, the RA response comprises a MAC Random Access Response (RAR). In some embodiments, the DCI is transmitted on the PDCCH and the MAC RAR is transmitted on the PDSCH. In some embodiments, before transmitting, the MAC RAR or the DCI is scrambled by the RA-RNTI determined by the BS 102 according to the information of the resources on which the random access preamble is transmitted on the frequency domain. In some embodiments, information of the resources on which the random access preamble is transmitted on the time domain is included in one of the following: the MAC RAR and the DCI.

In some embodiments, the UE 104 further calculates RA-RNTI value according to the frequency-domain information of the resource on which the random access preamble is transmitted. When the RA-RNTI scrambled MAC RAR or DCI is received by the UE 104 from the BS 102 within the time window 202, the UE 104 descrambles the MAC RAR or the DCI using the calculated RA-RNTI. If the scrambled MAC RAR can be descrambled by the UE 104 according to the calculated RA-RNTI, the frequency-domain information of the resources used by the BS 102 for determining the RA-RNTI matches the frequency-domain information of the resources used by the UE 104 for determining the RA-RNTI. When the MAC-RAR is successfully descrambled, the time-domain information of the resources can be determined and further compared with the time-domain information of the resources on which the random access preamble is transmitted by the UE 104. When the time-domain information of resources on which the random access preamble is transmitted by the UE 104 matches the time-domain information of resource in the MAC-RAR, the random access response is successfully received by the UE. When the time-domain information of resources on which the random access preamble is transmitted by the UE 104 does not match the time-domain information of resources in the MAC-RAR or the RA-RNTI scrambled MAC RAR or DCI is not received within the time window 202, the random access response is failed.

Figure 6:
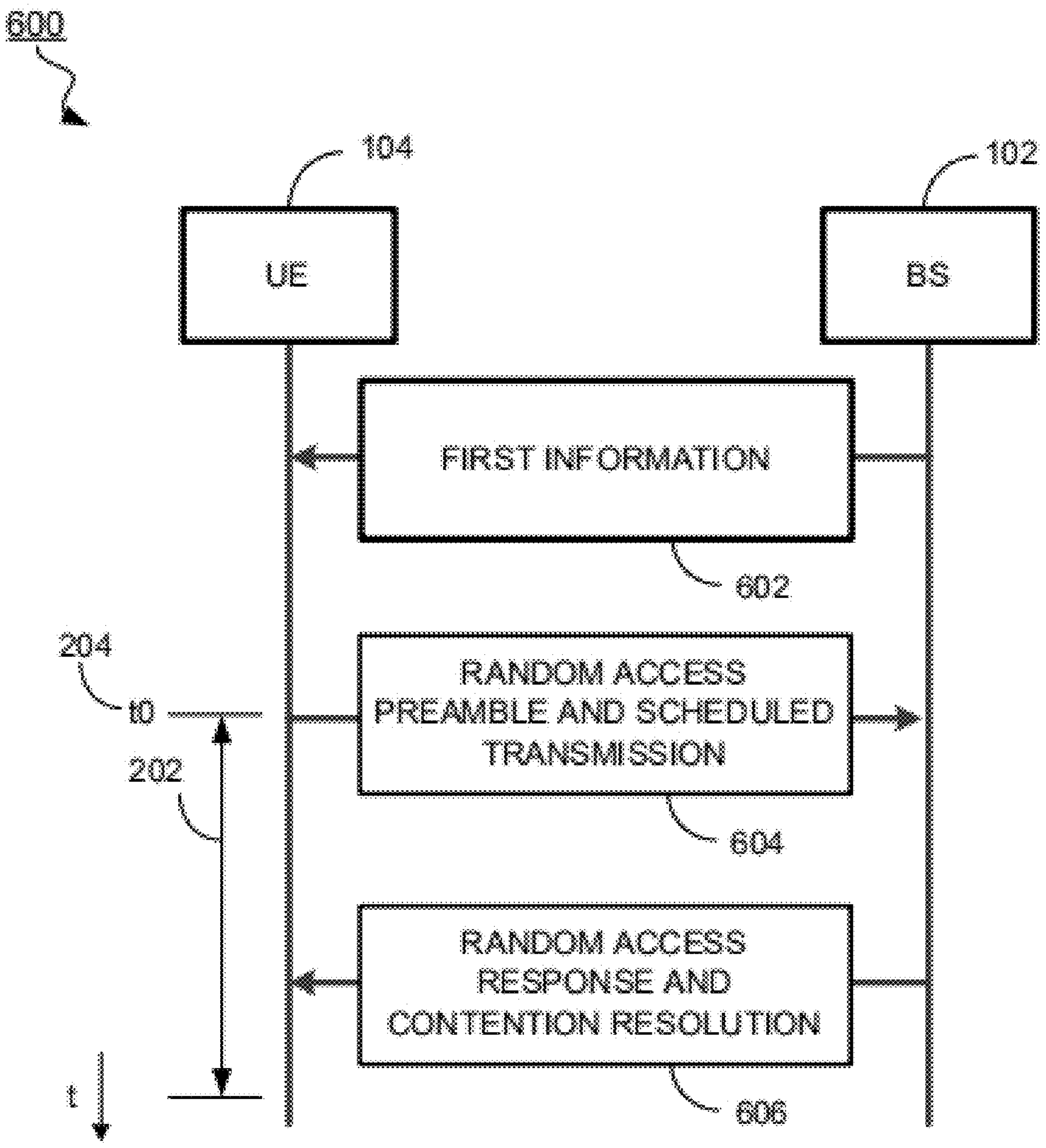
FIG. 6 illustrates a method of performing a 2-step contention-based Random Access (RACH) procedure in a wireless communication system, according to some embodiments of the present disclosure.

FIG. 6 illustrates a method 600 of performing a 2-step contention-based Random Access (RACH) procedure in a wireless communication system, according to some embodiments of the present disclosure. In the illustrated embodiment, the wireless communication system comprises a BS 102 and a UE 104. It is understood that additional operations may be provided before, during, and after the method 600 of FIG. 6, and that some other operations may be omitted or only briefly described herein. It should be noted FIG. 6 is an example for illustration and the 2-step contention-based RACH process of FIG. 6 is used for discussion purposes. It should be noted that the method 500 can be also used in a 4-step contention-based RACH process.

The method 600 starts with operation 602 in which the UE 104 receives first information from the BS 102 according to some embodiments. In some embodiments, the first information comprises information of a time windows. In some embodiments, the first information is transmitted in system information or a Radio Resource Control (RRC) message. In some embodiments, the time windows is configured for receiving a RA response by the UE 104 from the BS 102. In some embodiments, a size of the time window (e.g., 20 millisecond) is configured by the BS 102.

The method 600 starts with operation 604 in which the UE 104 transmits a random access preamble and scheduled transmission to the BS 102 according to some embodiments. Before transmitting the random access preamble to the BS 102, the UE 104 performs a LBT process on the selected at least one PRACH occasion. In some embodiments, the LBT process comprises sensing interference and bursty arrivals of packets through its transmitters to determine interference level and traffic loads on the uplink carrier. If the LBT process fails, the UE 104 restarts the LBT process at the following PRACH occasion on the corresponding uplink carrier until the LBT process passes (i.e., a channel is available and unoccupied). The UE 104 then starts first transmissions of random access preambles to the BS 102 on the PRACH occasion. The UE 104 starts the time window 202 (i.e., ra-ResponseWindow) at the start (i.e., t0) 204 of a first PDCCH occasion.

The method 600 continues with operation 606 in which the BS 102 generates and transmits a random access (RA) response and contention resolution to the UE 104, according to some embodiments. The BS 102 further calculates RA-RNTI (Random Access-Radio Network Temporary Identifier) values according to information of the resources on which the random access preambles are transmitted. In some embodiments, the RA-RNTI value can be is determined using the equation below, $$RA\text{-RNTI}=1+s\_id+14\times t\_id+14\times 80\times f\_id+14\times 80\times 8\times ul\_carrier\_id,$$

wherein s_id is the index of the first OFDM symbol of the PRACH occasion (0≤s_id<14); t_id is the index of the first slot of the PRACH occasion in a system frame (0≤t_id<80); f_id is the index of the first frequency of the PRACH occasion in the frequency domain (0≤f_id<8); and ul_carrier_id is the UL carrier used for the random access preamble (i.e., 0 for NUL carrier and 1 for SUL carrier). In some embodiments, f_id and ul_carrier_id each carries information of resources on the frequency domain on which the random access preamble is transmitted; and s_id and t_id each carriers information of resources on the time domain on which the random access preamble is transmitted.

In some embodiments, the RA response comprises a MAC Random Access Response (RAR). In some embodiments, the DCI is transmitted on the PDCCH and the MAC RAR is transmitted on the PDSCH. In some embodiments, before transmitting, the MAC RAR or the DCI is scrambled by the RA-RNTI determined by the BS 102.

In some embodiments, the SFN of a RACH occasion is determined by the BS 102 according to the SFN of receiving the random access preamble. In some embodiments, the SFN can be transmitted in one of the following: a MAC RAR and a DCI. For example, 10 bits in a MAC RAR or DCI can be used for representing the SFN for transmitting the radio access preamble. 3 lower bits of the 10 bits can be used for indicating the SFN. For another example, a radio frame in the MAC RAR or DCI can be used for representing the SFN for transmitting the radio access preamble. The radio frame is the SFN mod N, wherein N is an integer.

In some embodiments, the UE 104 further calculates RA-RNTI value according to the frequency-domain information of the resource on which the random access preamble is transmitted. When the RA-RNTI scrambled MAC RAR or DCI is received by the UE 104 from the BS 102 within the time window 202, the UE 104 descrambles the MAC RAR or the DCI using the calculated RA-RNTI.

When the MAC-RAR is successfully descrambled, the SFN can be determined and further compared with the SFN used for transmitting the random access preamble. When the value (e.g., the lower bit of the SFN or the SFN mod N) in the MAC RAR or the DCI received by the UE 104 from the BS 102 in the time window matches the SFN for transmitting the random access preamble by the UE 104, the random access response is received successfully by the UE 104. When the value (e.g., the lower bit of the SFN or the SFN mod N) in the MAC RAR or the DCI received by the UE 104 from the BS 102 in the time window does not match the SFN for transmitting the random access preamble by the UE 104 or the scrambled MAC RAR or DCI is not received by the UE 104 from the BS 102 within the time window, the random access response is failed.

Figure 7:
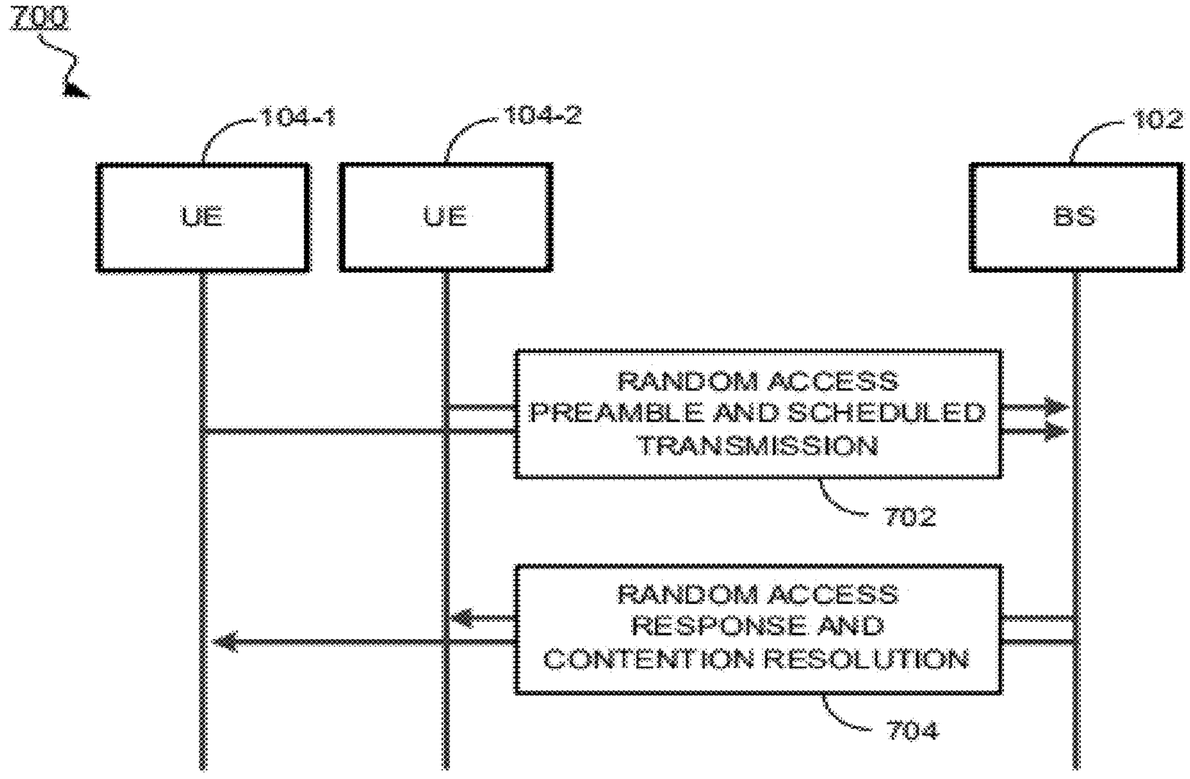
FIG. 7 illustrates a method of performing a 2-step contention-based Random Access (RACH) procedure in a wireless communication system, according to some embodiments of the present disclosure.

FIG. 7 illustrates a method 700 of performing a 2-step contention-based Random Access (RACH) procedure in a wireless communication system, according to some embodiments of the present disclosure. In the illustrated embodiment, the wireless communication system comprises a UE 104 and a BS 102. It is understood that additional operations may be provided before, during, and after the method 700 of FIG. 7, and that some other operations may be omitted or only briefly described herein. It should be noted FIG. 7 is an example for illustration and the 2-step contention-based RACH process of FIG. 7 is used for discussion purposes. It should be noted that the method 700 can be also used in a 4-step contention-based RACH process.

The method 700 starts with operation 702 in which the first UE 104-1 and the second UE 104-2 each transmits a random access preamble and scheduled transmission to the BS 102 according to some embodiments. Before transmitting the random access preamble to the BS 102, the UE 104 performs a LBT process on the selected at least one PRACH occasion. In some embodiments, the LBT process comprises sensing interference and bursty arrivals of packets through its transmitters to determine interference level and traffic loads on the uplink carrier. If the LBT process fails, the UE 104 restarts the LBT process at the following PRACH occasion on the corresponding uplink carrier until the LBT process passes (i.e., the uplink carrier is available and unoccupied). The first UE 104-1 and the second UE 104-2 then starts first transmissions of random access preambles to the BS 102 on the PRACH occasion. In some embodiments, the first message further comprises a MAC CE, wherein the MAC CE is configured to carry at least one of the following: information of the secondary primary cell (e.g., PCI), the information of the serving cell (e.g., ServCellIndex), and the information of the UE 104 (e.g., MAC-I), which are discussed in detail below in FIG. 8. In some embodiments, the first message further comprises at least one Media Access Control (MAC) Control Element (CE) for at least one of the following: a Cell-Radio Network Temporary Identifier (C-RNTI) MAC CE and a Buffer Status Report (BSR). In some embodiments, the first UE 104-1 and the second UE 104-2 can be differentiated according to the first MAC CE, and at least one of the following MAC CE: the C-RNTI MAC CE and the BSR MAC CE.

The method 700 continues with operation 704 in which the BS 102 generates and transmits a random access (RA) response and contention resolution to the UE 104, according to some embodiments. In some embodiments, the RA response comprises the DCI and a MAC Random Access Response (RAR). In some embodiments, the DCI is transmitted on the PDCCH and the MAC RAR is transmitted on the PDSCH. In some embodiments, the random access response and contention resolution further comprises information determined according to the random access preamble received from the UE 104. For example, during an initial access, the random access response comprises a MAC RAR subheader and a MAC RAR, wherein the MAC RAR comprises timing advance command, UL grant, and temporary C-RNTI; and the contention resolution comprises at least one of the following: ID MAC CE and a RRC setup message.

FIG. 8A illustrates an exemplary format of a MAC CE subheader 800, in accordance with some embodiments of the present disclosure. In the illustrated embodiment, the MAC CE subheader 800 is transmitted on a PDSCH and comprises 8 bits 402. In the illustrated embodiment, two reserved fields 802 occupying first 2 bits 402 and a Language Code Identifier (LCID) field 804 occupying last 6 bits. It should be noted that FIG. 8A is an exemplary format of the MAC CE subheader and is not intended to be limiting. Any MAC CE subheader with a field for indicating PCI can be used and is within the scope of this invention.

FIG. 8B illustrates a table 810 of LCID values in a MAC CE subheader, in accordance with some embodiments of the present disclosure. In the illustrated embodiment, the table 810 comprises 2 columns, i.e., a first column 812 showing a plurality of indices and a second column 814 comprising a plurality of corresponding LCID values. In the illustrated embodiment, the LCID field in the MAC CE subheader occupies 6 bits and 64 indices. In the illustrated embodiment, an index value of 0 indicates a Common Control Channel (CCCH) occupying 64 bits; an index value of 1-32 identifies an logical channel; an index of 33-50 is reserved; a value of 51 is for indicating a PCI; an index value of 52 indicates a CCCH occupying 48 bits; an index value of 53 indicates a recommended bit rate query; an index value of 54 indicates multiple entry Power Headroom Report (PHR) (4 octets); an index value of 55 indicates configured grate confirmation; an index value of 56 indicates multiple entry PHR (1 octet); and an index value of 57 indicates a single entry PHR; an index value of 58 indicates C-RNTI; an index value of 59 indicates short truncated BSR; an index value of 60 indicates long truncated BSR; an index value of 61 indicates short BSR; an index value of 62 indicates long BSR; and an index value of 63 indicates Padding.

Figure 8C:
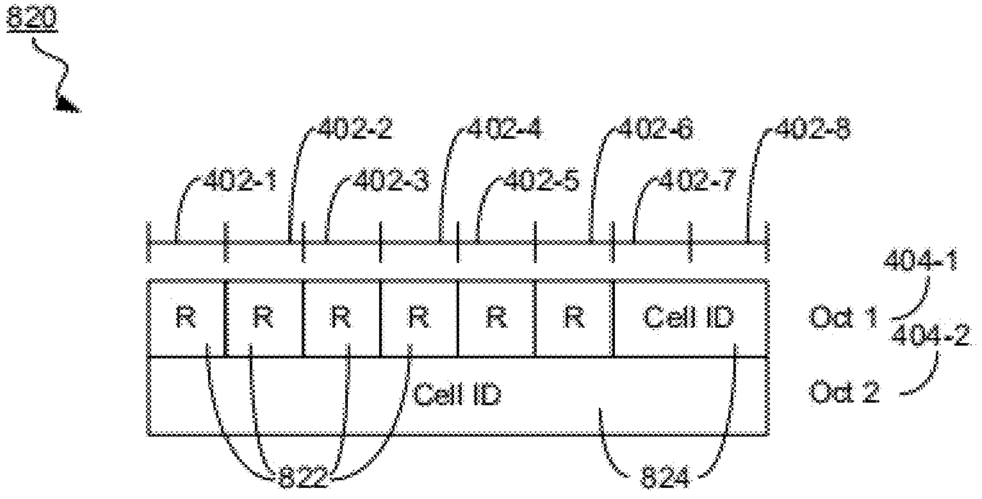
FIG. 8C illustrates another example format of a Media Access Control (MAC) Control Element (CE) subheader, in accordance with another embodiment.

FIG. 8C illustrates an exemplary format of a MAC CE 820, in accordance with some embodiments of the present disclosure. In the illustrated embodiment, the MAC CE 820 is transmitted on a PDSCH and comprises 2 octets 404. In the illustrated embodiments, 6 reserved fields 822 occupying first 6 bits 402 in a first octet 404-1, a physical cell ID 824 occupies last 2 bits 402 of the first octet 404-1 and 8 bits 402 of a second octet 404-2. In some embodiments, the physical cell ID field 824 occupying at least 10 bits is configured to carry the PCI of a UE 104. In some embodiments, the PCI and the C-RNTI are used to differentiate different UE 104. It should be noted that FIG. 8A is an exemplary format of the MAC CE and is not intended to be limiting. Any MAC CE with a field for indicating the PCI can be used and is within the scope of this invention.

Figure 8D:
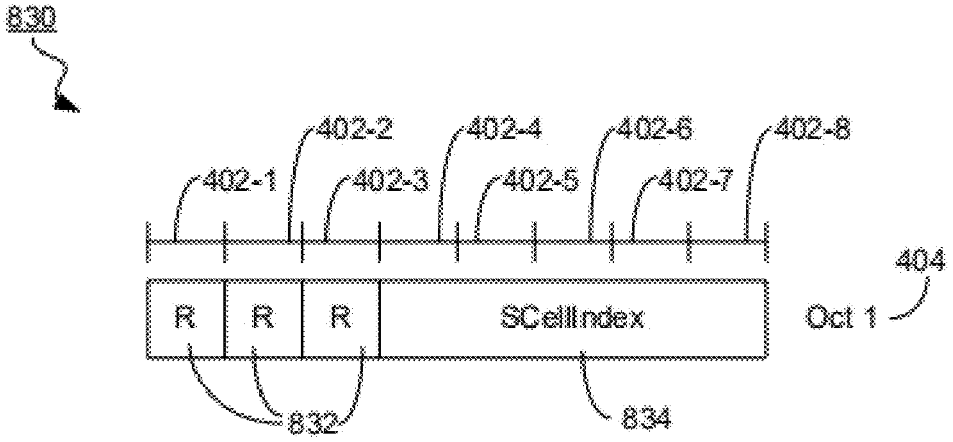
FIG. 8D illustrates another example format of a Media Access Control (MAC) Control Element (CE) subheader, in accordance with another embodiment.

FIG. 8D illustrates an exemplary format of a MAC CE 830, in accordance with some embodiments of the present disclosure. In the illustrated embodiment, the MAC CE 830 is transmitted on a PDSCH and comprises 1 octet 404. In the illustrated embodiments, 3 reserved fields 832 occupying first 3 bits 402, and a serving Cell index (ServCellIndex) field 834 occupies last 6 bits 402. In some embodiments, the ServCellIndex field 834 occupying 6 bits is configured to carry serving cell information of a UE 104. In some embodiments, the serving cell information and the C-RNTI are used to differentiate different UE 104. It should be noted that FIG. 8D is an exemplary format of the MAC CE and is not intended to be limiting. Any MAC CE with a field for indicating the serving cell information can be used and is within the scope of this invention.

Figure 8E:
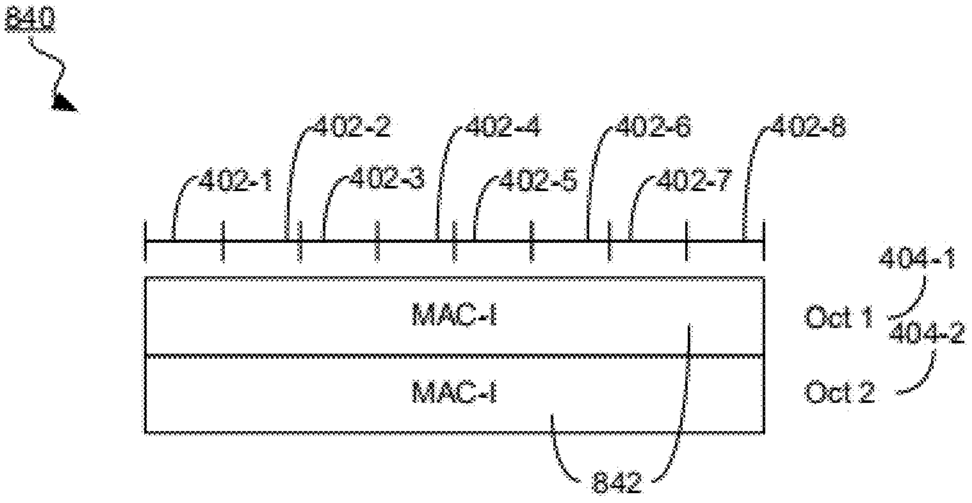
FIG. 8E illustrates another example format of a Media Access Control (MAC) Control Element (CE) subheader, in accordance with another embodiment.

FIG. 8E illustrates an exemplary format of a MAC CE 840, in accordance with some embodiments of the present disclosure. In the illustrated embodiment, the MAC CE 840 is transmitted on a PDSCH and comprises 2 octets 404. In the illustrated embodiments, a MAC-I field 842 occupies 16 bits 402 of the 2 octets. In some embodiments, the MAC-I field 842 is configured to carry information of a UE 104. In some embodiments, the information of the UE 104 in the MAC-I field 842 is used to differentiate different UE 104. It should be noted that FIG. 8*e* is an exemplary format of the MAC CE and is not intended to be limiting. Any MAC CE with a field for indicating the information of the UE 104 can be used and is within the scope of this invention.

Figure 9:
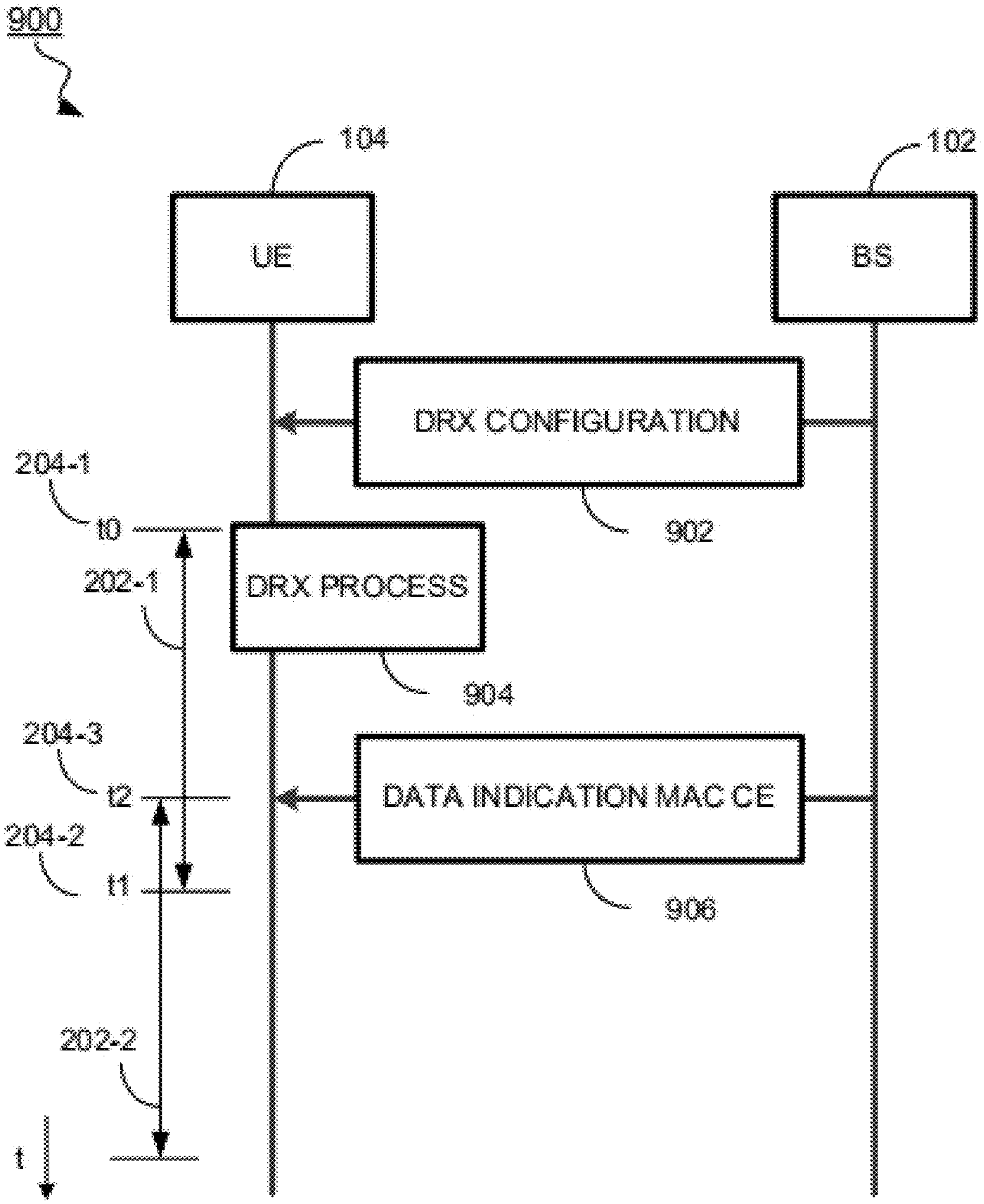
FIG. 9 illustrates a method for a discontinuous reception mode (DRX) process, in accordance with some embodiments of the present disclosure.

FIG. 9 illustrates a method 900 for a discontinuous reception mode (DRX) process, in accordance with some embodiments of the present disclosure. In the illustrated embodiment, the wireless communication system comprises a UE 104 and a BS 102. In the illustrated embodiment, the UE 104 is in a DRX mode, in which the UE 104 only performs a Physical Downlink Control Channel (PDCCH) blind detection during an active time and turns off monitoring PDCCH during a non-active time. In some embodiments, the active time and non-active time appear alternatively and periodically. When no service is detected during an active time and when the active time window ends, the UE 104 enters a following non-active time. It is understood that additional operations may be provided before, during, and after the method 900 of FIG. 9, and that some other operations may be omitted or only briefly described herein. It should be noted FIG. 9 is an example for illustration and discussion purposes.

The method 900 starts with operation 902 in which at least one DRX parameter is configured to the UE 104 from the BS 102 according to some embodiments. In some embodiments, the at least one DRX parameter comprises a period of a DRX process, a DRX inactive timer, an active time and a non-active time. In some embodiments, the at least one DRX parameter is configured by the BS 102 to the UE 104 through a RRC reconfiguration process.

The method 900 continues with operation 904 in which the UE 104 starts the DRX process according to some embodiments. In some embodiments, the UE 104 determines to enter an active time according to the at least one DRX parameter and service scheduling situation of the BS 102. In some embodiments, a first active timer indicated in the DRX parameter is started at time t0 204-1 when the UE 104 starts the DRX process and the first active timer has a window size 202-1 which terminates at time t1 204-2.

The method 900 continues with operation 906, in which a first message is received by the UE 104 from the BS 102 according to some embodiments. In some embodiments, the first message is a media access control message, e.g., MAC PDU, in a format of a data-indication MAC control element (CE). In some embodiments, the first message is received at time t2 204-3 before the termination of the first active timer. In some embodiments, the first message is transmitted on a PDSCH. In some embodiments, the data-indication MAC CE is for an indication of pending data for transmission from the BS 102 to the UE 104 so as to start a second active timer before an expiration of the first active timer. In some embodiments, the data-indication MAC CE is identified in the MAC PDU subheader with LCID, which is discussed in FIG. 10 below. In some embodiments, the second active timer has a window size 202-2, wherein the window size of the second active timer can be one of the following: the DRX inactive timer configured in the at least one DRX parameter and a second active timer configured by the BS 102. In some embodiments, after receiving the first message, the UE 104 remains active for receiving the pending data from the BS 102 according to some embodiments. In some embodiments, when the UE 104 receives the data-indication MAC CE in the first message, the UE 104 further performs one of the following: restarting the DRX inactive timer and starting a new timer, so as to continue with the PDCCH blind detection.

FIG. 10A illustrates an exemplary format of a MAC CE subheader 1000, in accordance with some embodiments of the present disclosure. In the illustrated embodiment, the MAC CE subheader 1000 is transmitted on a PDSCH and comprises 8 bits 402. In the illustrated embodiment, two reserved fields 1002 occupying first 2 bits 402 and a LCID field 1004 occupying last 6 bits. It should be noted that FIG. 10A is an exemplary format of the MAC CE subheader and is not intended to be limiting. Any MAC CE subheader with a field for indicating PCI can be used and is within the scope of this invention.

FIG. 10B illustrates a table 1010 of Language Code Identifier (LCID) values in a MAC CE subheader, in accordance with some embodiments of the present disclosure. In the illustrated embodiment, the table 1010 comprises 2 columns, i.e., a first column 1012 showing a plurality of indices and a second column 1014 comprising a plurality of corresponding LCID values. In the illustrated embodiment, the LCID field in the MAC CE subheader occupies 6 bits and 64 indices. In the illustrated embodiment, an index value of 0 indicates a CCCH occupying 64 bits; an index value of 1-32 identifies an logical channel; an index of 33-45 is reserved; an index value of 46 is for data indication command; an index value of 47 indicates recommended bit rate; an index value of 48 indicates semi-persistent zero power channel state information-reference signal (SP ZP CSI-RS) Resource Set Activation/Deactivation; an index value of 49 indicates PUCCH spatial relation Activation/Deactivation; a value of 50 indicates semi-persistent sounding reference signal (SP SRS) Activation/Deactivation; a value of 51 indicates SP CSI reporting on PUCCH Activation/Deactivation; an index value of 52 indicates a Transmission Configuration Indication (TCI) State Indication for UE-specific PDCCH; an index value of 53 indicates TCI states Activation/Deactivation for UE-specific PDSCH; an index value of 54 indicates Aperiodic CSI Trigger State Subselection; an index value of 55 indicates SP CSI-RS/semi-persistent channel state information interference measurement (CSI-IM) Resource Set Activation/Deactivation; an index value of 56 indicates Duplication Activation/Deactivation; an index value of 57 SCell Activation/Deactivation (Four Octets); an index value of 58 indicates SCell Activation/Deactivation (One Octet); an index value of 59 indicates Long DRX Command; an index value of 60 indicates DRX command; an index value of 61 indicates Timing Advance Command; an index value of 62 indicates UE Contention Resolution Identity; and an index value of 63 indicates Padding.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the some illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

I claim:

1. A method performed by a wireless communication device, comprising:

receiving first information from a wireless communication node, wherein the first information comprises information of a plurality of time windows for receiving a second message;

transmitting a first message to the wireless communication node using a System Frame Number (SFN) for transmitting the first message, wherein the SFN for transmitting the first message is used to indicate one of the time windows of the plurality of time windows; and receiving the second message from the wireless communication node within a time window of the plurality of time windows based on the first information, wherein the second message comprises an SFN received in a Downlink Control Information (DCI) comprised in the second message;

comparing the SFN in the DCI with the SFN used for transmitting the first message so as to differentiate different time windows; and determining that the second message is successfully received when the SFN in the DCI received within the time window matches the SFN used for transmitting the first message, wherein 10 bits in the DCI are used for representing the SFN for transmitting the first message, wherein 3 lower bits of the 10 bits are used for indicating the SFN.

2. A method performed by a wireless communication node, comprising:

transmitting first information to a wireless communication device wherein the first information comprises information of a plurality of time windows for receiving a second message;

receiving a first message from the wireless communication device using a System Frame Number (SFN) for transmitting the first message, wherein the SFN for transmitting the first message is used to indicate one of the time windows of the plurality of time windows; and transmitting the second message to the wireless communication device within a time window of the plurality of time windows based on the first information, wherein the second message comprises an SFN transmitted in a Downlink Control Information (DCI) comprised in the second message;

wherein the wireless communication device compares the SFN in the DCI with the SFN used for transmitting the first message so as to differentiate different time windows, and determines that the second message is successfully received when the SFN in the DCI received within the time window matches the SFN used for transmitting the first message, wherein 10 bits in the DCI are used for representing the SFN for transmitting the first message, wherein 3 lower bits of the 10 bits are used for indicating the SFN.

3. A wireless communication device, comprising at least one processor and a memory coupled to the processor, the at least one processor configured to:

receive, via a transceiver, first information from a wireless communication node, wherein the first information comprises information of a plurality of time windows for receiving a second message;

transmit, via the transceiver, a first message to the wireless communication node using a System Frame Number (SFN) for transmitting the first message, wherein the SFN for transmitting the first message is used to indicate one of the time windows of the plurality of time windows; and receive, via the transceiver, the second message from the wireless communication node within a time window of the plurality of time windows based on the first information, wherein the second message comprises an SFN received in a Downlink Control Information (DCI) comprised in the second message;

compare the SFN in the DCI with the SFN used for transmitting the first message so as to differentiate different time windows; and determine that the second message is successfully received when the SFN in the DCI received within the time window matches the SFN used for transmitting the first message, wherein 10 bits in the DCI are used for representing the SFN for transmitting the first message, wherein 3 lower bits of the 10 bits are used for indicating the SFN.

4. A wireless communication node, comprising at least one processor and a memory coupled to the processor, the at least one processor configured to:

transmit, via a transceiver, first information to a wireless communication device wherein the first information comprises information of a plurality of time windows for receiving a second message;

receive, via the receiver, a first message from the wireless communication device using a System Frame Number (SFN) for transmitting the first message, wherein the SFN for transmitting the first message is used to indicate one of the time windows of the plurality of time windows; and transmit, via the transceiver, the second message to the wireless communication device within a time window of the plurality of time windows based on the first information, wherein the second message comprises an SFN transmitted in a Downlink Control Information (DCI) comprised in the second message;

wherein the wireless communication device is configured to compare the SFN in the DCI with the SFN used for transmitting the first message so as to differentiate different time windows, and determine that the second message is successfully received when the SFN in the DCI received within the time window matches the SFN used for transmitting the first message, wherein 10 bits in the DCI are used for representing the SFN for transmitting the first message, wherein 3 lower bits of the 10 bits are used for indicating the SFN.

* * * * *